(12) United States Patent
Ehmer

(10) Patent No.: US 6,401,049 B1
(45) Date of Patent: Jun. 4, 2002

(54) PROCESS FOR INSPECTING THE COMPONENTS OF A SYSTEM IN A MOTOR VEHICLE

(75) Inventor: Norbert Ehmer, Eschborn (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/254,358

(22) PCT Filed: Aug. 28, 1997

(86) PCT No.: PCT/EP97/04693

§ 371 (c)(1),
(2), (4) Date: Jun. 2, 1999

(87) PCT Pub. No.: WO98/10300

PCT Pub. Date: Mar. 12, 1998

(30) Foreign Application Priority Data

Sep. 4, 1996 (DE) ............................ 196 35 839

(51) Int. Cl.⁷ ............................................. G01M 15/00
(52) U.S. Cl. .................... 702/119; 702/120; 702/121; 702/108; 702/62
(58) Field of Search .......................... 702/57, 58, 59, 702/62, 80, 108, 113–123, 145–149, 142, 182–185, 188, FOR 103, 104, 124, 134, 135, 150, 151, 170, 171; 700/79, 81, 86–88; 711/115; 701/29–35

(56) References Cited

U.S. PATENT DOCUMENTS

| | | | |
|---|---|---|---|
| 4,532,594 A | | 7/1985 | Hosaka |
| 5,050,080 A | * | 9/1991 | Abe ...................... 364/424.04 |
| 5,255,208 A | * | 10/1993 | Thakore et al. ........ 364/551.01 |
| 5,278,759 A | * | 1/1994 | Berra et al. ............ 364/424.01 |
| 5,438,528 A | * | 8/1995 | Emerson et al. ............ 364/580 |
| 5,646,865 A | * | 7/1997 | Alfaro et al. ........... 364/514 R |
| 5,884,202 A | * | 3/1999 | Arjomand ..................... 701/29 |
| 5,908,455 A | * | 6/1999 | Parvahan ..................... 701/29 |
| 6,009,360 A | * | 12/1999 | Knapp .......................... 701/29 |
| 6,094,609 A | * | 7/2000 | Arjomand ..................... 701/29 |
| 6,134,489 A | * | 10/2000 | Smedley ....................... 701/35 |
| 6,169,943 B1 | * | 1/2001 | Simon et al. ................. 701/29 |
| 6,181,992 B1 | * | 1/2001 | Gurne et al. .................. 701/29 |

FOREIGN PATENT DOCUMENTS

| | | |
|---|---|---|
| DE | 33 05 807 | 9/1983 |
| DE | 35 46 127 | 6/1987 |
| DE | 38 13 980 | 11/1988 |
| DE | 37 17 012 | 12/1988 |
| DE | 39 32 436 | 3/1990 |
| DE | 42 38 539 | 5/1994 |
| DE | 44 00 079 | 7/1995 |
| EP | 0 465 793 | 1/1992 |
| EP | 0 599 488 | 6/1994 |
| WO | 89 06839 | 7/1989 |

OTHER PUBLICATIONS

Search Report of the German Patent Office for German Appl. No. 196 35 839.6.

* cited by examiner

Primary Examiner—Marc S. Hoff
Assistant Examiner—Carol S. Tsai
(74) Attorney, Agent, or Firm—Rader, Fishman & Grauer PLLC

(57) ABSTRACT

A process of testing individual components of a system in an automotive vehicle, wherein the system comprises at least one software-operated controller and the controller is adapted to be connected to an input station, with software being adapted to be uploaded to the input station from the controller and a test software being uploaded from the input station to the controller prior to a check of the components of the system.

10 Claims, 2 Drawing Sheets

PROCESS FOR INSPECTING THE COMPONENTS OF A SYSTEM IN A MOTOR VEHICLE

Figure 1:
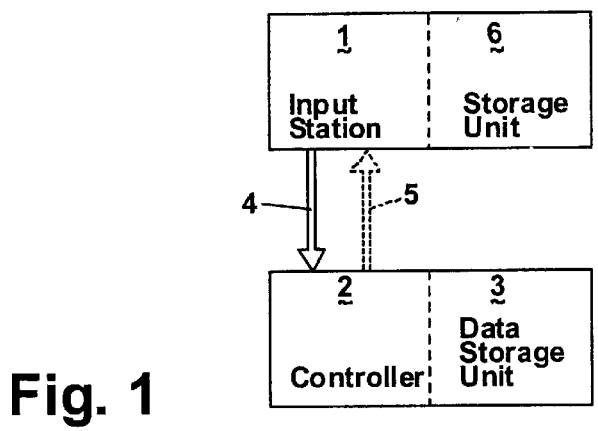

The present invention is concerned with a process of testing the operability of the components of a system in an automotive vehicle, with the system comprising at least one software-operated controller that can be connected to an input station, with software being uploaded through the input station in the controller and with a test software being uploaded through the input station in the controller prior to checking for operability of the components of the system.

Applicant is aware of a process of this type, wherein both the operating software for controlling or regulating the system and a testing software are permanently installed in the controller by way of which the components of the system are checked for correct assembly and operability of the components. A process of this type is employed, for example, in connection with an anti-locking control in a brake system of an automotive vehicle.

SUMMARY OF THE INVENTION

It is the object of the present invention to carry out the check for operability of the components of a system without requiring any substantial changes in the system, at the same time involving minimal storage capacity requirements.

In the practice of the invention, this problem is solved by a process of the afore-mentioned type which is characterized in that after the check having been completed, the operating software by which the system is controlled and/or regulated is uploaded from an input station to the controller.

According to the process of the invention the test software can be readily adapted to changes in the system. While according to the state of art it has been necessary to completely change the controller because the software has been installed therein with no modifying option, the software according to the process of the invention can be changed and, through the input station, can be uploaded in the corresponding controller once the test software is required. Hence, only the test software is to be installed in the respective input stations, with the input stations being needed, for example, at the end of the production process for testing the components of the system, or in workshops to perform checks for operability of the components of the system at predetermined time intervals—in response to time or on the basis of the mileage covered from the previous test or on the basis of an error otherwise detected but not yet identified in any detail.

Hence, in the process according to the invention, after completion of the check, the test software is replaced by the operating software, thereby minimizing general storage capacity (i.e. digital memory) requirements. It has proved to be advantageous that, during testing, the operating software is not installed in the controller; rather, it is installed only after the test software has completed its testing so that the full storage capacity of the control unit will be dedicated to the test software during testing.

In an advantageous embodiment according to the process of claim 2, uploading of the test software is automatically effected after a connection between controller and input station having been established. Once the controller is connected to the input station, as a rule, a check for operability of the components of the system is to be effected. Handling and completion of the test is particularly easy if uploading of the test software takes place automatically, with the test also starting automatically after uploading of the test software.

According to another advantageous embodiment of the process of claim 3 system-specific data is transmitted to the input station. Such system-specific data can, for example, be a version number of the control unit and/or information on the components integrated into the system. The test software corresponding to the system-specific data is then uploaded from the input station, it being possible to store in the input station several test programs corresponding to a variety of possible system-specific data so that the corresponding test software is then selected in the input station.

Also it will be possible for the system-specific data in the input station to be so evaluated that based on the components identified on the basis of the system-specific data predetermined nominal values and tolerances are correspondingly determined in a Table and are uploaded as part of the test software from the input station in the controller.

Alternatively, the test software with respect to some test steps can be adapted accordingly.

If all versions of the operating software that can occur on the basis of system configurations and components employed are installed in the input station, the operating software in the controller can be canceled prior to uploading the test software in the controller.

However, also it is possible to reload the operating software from the controller in the input station for temporary storage.

Moreover, the measures of the invention permit a simple adaptation to changes in the operating software if no temporary storage of the operating software in the input station is effected to subsequently upload the same software again in the controller.

The correspondingly changed operating software is then installed in the input stations of the individual workshops. The vehicles are then subjected, bit by bit, to a check for operability of the components of their systems. After completion of the check, the operability of the components of their systems. After completion of the check, the correspondingly changed operating software is respectively uploaded in the controllers of the individual automotive vehicles. Consequently, an adaptation to the changed operating software is effected, bit by bit, in all vehicles with no need for exchanging the control units in the automotive vehicles.

Similarly, it can be taken into consideration in the manufacture of automotive vehicles that different vehicle types require different operating software. Hence, in the manufacture of automotive vehicles it will not be necessary to keep in stock different control units.

According to the process of claim 5, after completion of the test the operating software is automatically uploaded or loaded back, again insuring easy handling in carrying out the test.

According to the process of claim 5, the operating software will be uploaded only if the check has resulted in that the system does not contain an error. Once an error has been detected, it must first be rectified. A control unit with no operating software can be treated as a defective system; this means that a corresponding warning lamp is actuated. After the error having been rectified it is feasible to re-check the components to insure that there is no other error. Time can be saved if no test software or operating software is to be reloaded.

According to an advantageous embodiment of the process set out in claim 6, system-specific data is transmitted to the input station. Then the operating software corresponding to the system-specific data is uploaded from the input station. An update of the operating software can be easily realized even if different operating software According to another embodiment of the process of claim 8 a data storage unit is provided in the controller in which data is stored during or after completion of the test process, thereby enabling, for example, on the basis of the date of manufacture or test site number, that statistical data on the quality rate, the number of error corrections during service be collected or even a non-failure statement be made.

In the embodiment according to the process of claim 8 it has proved advantageous that the data storage unit is a non-volatile data storage so that the information remains stored therein even if the board battery of the automotive vehicle is disconnected. In particular, it has been found in respect of evaluations over an extended period of time that no information can get lost.

According to the embodiment of the process of claim 9, depending on the tolerances of the various components, sensors or other units determined during the check, such parameters are stored in the controller on which the operating software can rely and by means of which an optimum adaptation to all components can individually be effected during operation.

This will readily permit not only easy identification and correction of errors but also rectification of deviations that are within predetermined tolerances not yet forming errors but being likely to affect the function of the whole system.

According to an embodiment of the process of claim 10 all tests performed will be documented. The advantage involved resides in that the test process as a whole can be traced and documented over an extended period of time.

Figure 2:
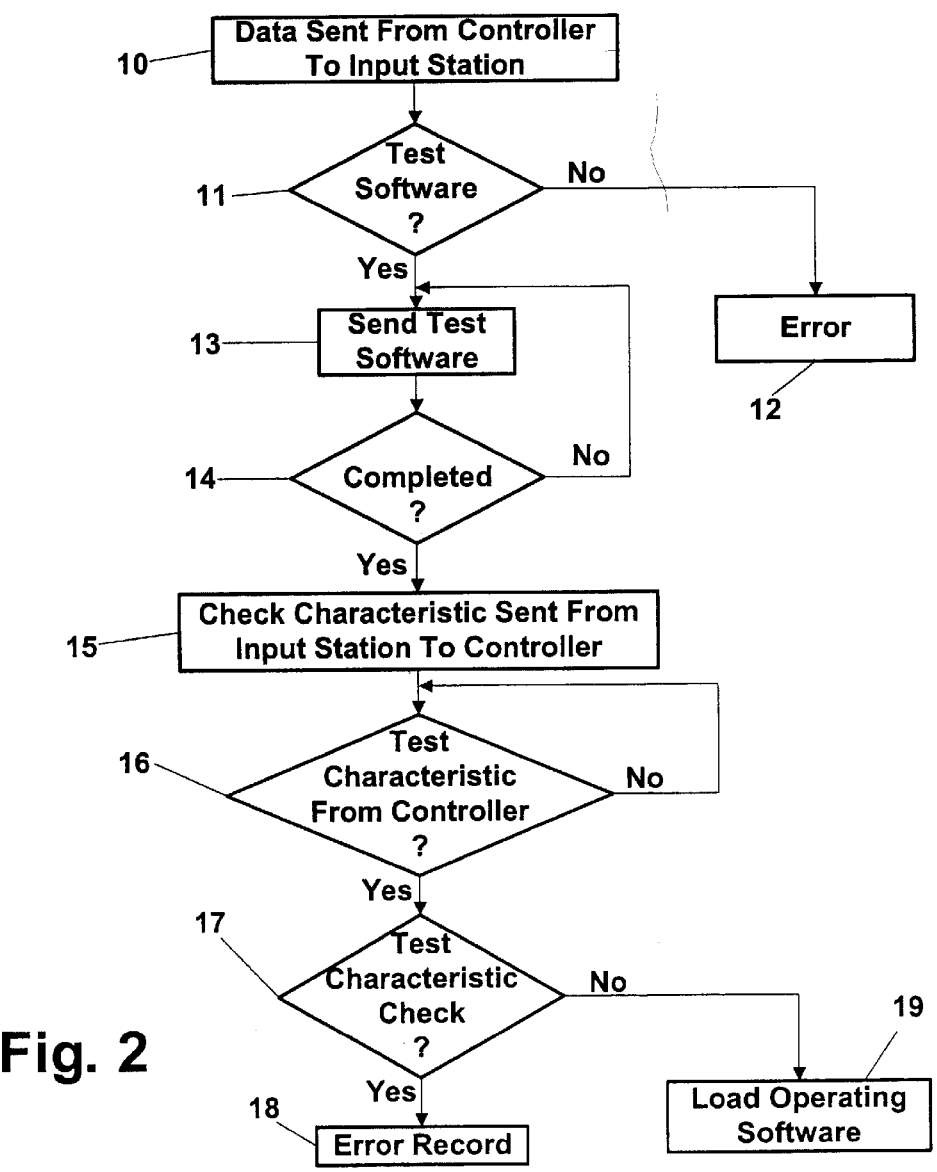
Figure 3:
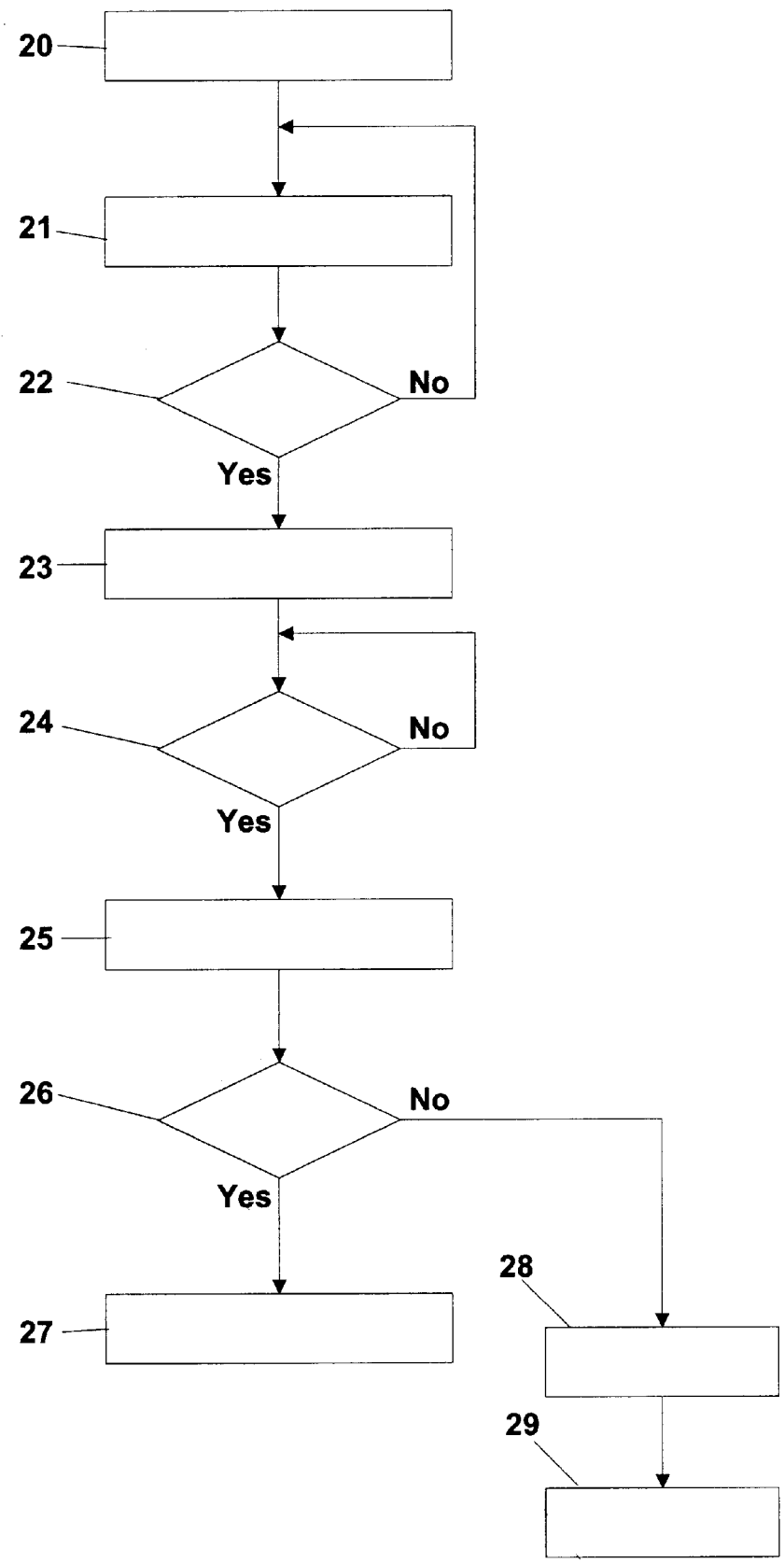

Now, one example of embodiment of the invention well be described in greater detail with reference to the drawing, wherein FIG. 1 schematically shows an input station in cooperation with a controller, FIG. 2 shows an example of a flow diagram in the input station, and FIG. 3 shows an example of a flow diagram in the controller in cooperation with the flow diagram according to FIG. 2.

Referring to the drawings, FIG. 1 shows an input station 1 comprising a storage unit 6 in which can be stored, for example, different versions of test software for the respective control units, as well as different versions of operating software for the respective control units.

The input station 1 is able to transmit data, such as test software or operating software, to a controller 2 via a connecting line 4. Equally, data can be transmitted from the controller 2 to the input station 1, for example, via a separate data line 5.

Advantageously, a data storage unit 3 is provided in the controller 2, storing information on the check for operability of the components of the system mounted in an automotive vehicle. Information stored in the data storage unit 3 also can be transmitted to the input station 1. Similarly, in response to the tolerances of the various components, sensors or other units determined during the check, parameters can be stored in the data storage unit 3 on which the operating software can rely and by means of which an optimum adaptation to all components can be individually achieved during operation.

FIG. 2 shows a flow diagram of a part of the process carried out in the input station 1. In step 10 system-specific data is first transmitted from the controller to the input station. Such a transmission can be effected, for example, by determining that the controller 2 was connected to the input station 1, causing the system-specific data to be transmitted. The system-specific data can relate, for example, to the version number of the controller 2 or to information on the system configuration or the components as employed.

DETAILED DESCRIPTION OF THE PREFERRED EMBODIMENTS

Referring to the drawings, FIG. 1 shows an input station 1 comprising a storage unit 6 in which can be stored, for example, different versions of test software for the respective controllers, as well as different versions of operating software for the respective controllers.

In the absence of such data the corresponding error is displayed in step 12.

If the corresponding test software is available or can be generated by way of the transmitted system-specific data by changing tables, for example, by adapting nominal values or tolerances, or by changing the programs in the input station 1, transmission of the corresponding test software is effected in step 13.

A check as to whether or not the transmission of the test software is completed, is carried out in step 14.

If such transmission has not been completed, transmission of the test software will be continued in step 13.

If the check according to step 14 conveys that transmission of the test software has been completed, a corresponding characteristic is transmitted in step 15 from the input station 1 to the controller 2.

A check characteristic will be transmitted from controller 2 to the input station 1 once the check has been completed. Individually, this will be explained in greater detail in connection with FIG. 3.

A check will be carried out in step 16 as to whether or not the test characteristic has been transmitted from the controller.

If the said test characteristic has been transmitted it will be checked in step 17.

If the test characteristic conveys that an error has been detected during the check, an error record is set up in step 18 which can be effected, for example, by evaluating the test characteristic if individual errors can thereby be itemized. A simple display conveys that an error has been detected. However, also other information can be evaluated which is transmitted from controller 2 to the input station 1 if the detected error can, in special circumstances, be identified by such additional information.

If the check effected in step 17 results in that no error has been detected, the corresponding operating software for the control unit is uploaded in step 19 from the input station 1 to the controller 2.

The said operating software can be read, for example, from the storage unit 6 of the input station 1.

It is possible that at the beginning of the transmission process, the operating software of the controller 2 is transmitted to the input station 1 for temporary storage therein. The operating software uploaded from the controller 2 prior to the check is then re-loaded.

Similarly, it is possible for different versions of the operating software to be stored in storage unit 6 and for the corresponding version of the operating software to be selected on the basis of the system-specific data as transmitted. Also an update of the operating software can at the same time be carried out in a simple way.

However, it will also be possible not to upload the operating software if the test software is uploaded in the controller prior to the check in addition to the operating software, with the test software, hence, remaining in the controller.

However, if the operating software is no longer installed in the controller when the test software is uploaded, the test software has available a higher capacity.

FIG. 3 shows an example of a flow diagram of the process carried out in controller 2 in cooperation with the flow diagram of the process according to FIG. 2 which is carried out in the input station 1.

In step 20, first system-specific data is transmitted from controller 2 to the input station 1.

In step 21, input of the test software is effected which is transmitted from the input station 1 to the controller 2. The operating software of the controller 2, preferably, was transmitted before, for temporary storage, to the input device 1 or is overwritten, i.e. canceled, involving the advantage of that the test software can fully rely on all resources. However also it will be possible to leave the operating software in the controller 2.

In step 22, a check will be carried out as to whether or not the transmission characteristic has been transmitted from the input station 1. In accordance with step 15 of FIG. 2, this means that the transmission of the test software has been completed.

If the transmission characteristic has not yet been detected in the controller 2, the test software will be further read-in by step 21.

If the transmission characteristic has been recognized, the check of the components of the system will be started in step 23.

In step 24 a check will be carried out as to whether or not the check of the components of the system has been completed.

If such test has not yet been completed, the check for operability of the components of the system (step 23) will be continued.

Otherwise the data determined in step 25 during the check is stored in the data storage unit 3. Such data, in addition to a documentation of the test steps, can also be parameters determined in response to the tolerances of the various components, sensors or other unit detected during the check, upon which the operating software can rely later and by means of which, during operation, an optimum adaptation to all components is individually achieved.

In step 26 a check is carried out to determine whether or not an error has been detected during the test.

In the affirmative, an error record is set up in accordance with step 27. It is possible to transmit not only the test characteristic conveying "error detected" but also the information, and to more closely define the error in the input station 1. Similarly, it is possible to set up in the controller 2 the complete error record and to transmit the same to the input station 1 for display.

If no error has been detected in step 26, the corresponding test characteristic conveying "no error" will be transmitted in step 28 to the input station 1.

It will be possible to set up in step 28 a record on the completed test steps that have resulted in an error-free outcome, and to transmit the same along with the corresponding check characteristic. Similarly, in addition to the error record, also the check steps conveying an error-free result can be recorded in step 27. It is then possible to set up a documentation of all test steps.

In step 29, the corresponding operating software will then be uploaded from the input station 1 in the controller 2.

In conclusion, it is to be stated that it is easy to adapt the test software individually to the various manufacturers, manufacturing plants or manufacturing processes irrespective of the operating software.

What is claimed is:

1. A process of testing the operability of the components of a system in an automotive vehicle, with the system comprising:

at least one software-operated controller of a vehicle adapted to be connected to an input station, wherein an operating software is uploaded from the controller to the input station for temporary storage, and wherein a test software is uploaded from the input station to the controller prior to a check for operability of the components of the system, wherein after completion of the check the operating software, through which the control or regulation of the system is accomplished, is re-loaded from the input station to the controller.

2. A process according to claim 1, wherein after a connection between the controller and the input station is established, the test software is automatically uploaded in the controller.

3. A process according to claim 1, wherein system-specific data is transmitted from the controller to the input station, and wherein the test software corresponding to the system-specific data is uploaded from the input station.

4. A process according to any claim 1, wherein upon completion of the check the operating software is automatically uploaded.

5. A process according to claim 3, wherein the operating software is uploaded only if the test conveys that no error is contained in the system.

6. A process according to claim 3, wherein a system-specific data is transmitted from the controller to the input station and that the operating software corresponding to the system-specific data is uploaded from the input station.

7. A process according to claim 1, wherein a data storage unit is provided in the controller in which data is stored during the test operation or upon completion thereof.

8. A process according to claim 7, wherein the data storage unit is a non-volatile data storage.

9. A process of testing the operability of the components of a system in an automotive vehicle, with the system comprising:

at least one software-operated controller adapted to be connected to an input station, wherein an operating software is uploaded from the controller to the input unit, and wherein a test software is upload from the input station to the controller prior to a check for operability of the components of the system, wherein after completion of the check the operating software, through which the control or regulation of the system is accomplished, is uploaded from the input station to the controller, wherein response to the tolerances of the various components, sensors or other units determined during the check, susch parameters are stored in the controller upon which the operating software can rely and by means of which, during operation, an optimum adaptation to all components can be individually achieved.

10. A process according to claim 1, wherein a documentation of all test steps is set up.

* * * * *

UNITED STATES PATENT AND TRADEMARK OFFICE
CERTIFICATE OF CORRECTION

PATENT NO.     : 6,401,049 B1
DATED          : June 4, 2002
INVENTOR(S)    : Norbert Ehmer It is certified that error appears in the above-identified patent and that said Letters Patent is hereby corrected as shown below:

<u>Column 6,</u>
Line 60, change "susch parameters are" to -- such parameters are --.

Signed and Sealed this

Third Day of December, 2002

JAMES E. ROGAN
*Director of the United States Patent and Trademark Office*